United States Patent Office 2,889,231
Patented June 2, 1959

2,889,231
BITUMEN AND AGGREGATE COMPOSITION AND A BUILDING BLOCK MOLDED THEREFROM

Duane W. Gagle and Charles E. Defabaugh, Bartlesville, Okla., assignors to Phillips Petroleum Company, a corporation of Delaware No Drawing. Original application August 18, 1952, Serial No. 305,068, now Patent No. 2,775,530, dated December 25, 1956. Divided and this application February 10, 1956, Serial No. 564,645

8 Claims. (Cl. 106—280)

This invention relates to improvements in mixtures of asphalt and aggregate. In a more specific aspect this invention relates to improved paving compositions comprising bitumen and aggregate compositions which are resistant to deterioration by water. In another specific aspect it relates to improved asphalt-aggregate paving compositions.

This application is a division of our copending application Serial No. 305,068, filed August 18, 1952, now U.S. Patent No. 2,775,530.

Paving compositions are widely used which are composed of mineral aggregate and bituminous constituents, usually asphalt. This type of pavement while economical and durable has a disadvantage of being subject to deterioration by moisture. Many mineral aggregates have a greater affinity for water than for asphalt; therefore, many asphalt-coated aggregate compositions such as are used in surfacing roads and streets are adversely affected by moisture. Even when the aggregate is already coated with asphalt, water in vapor or liquid form will slowly permeate the asphalt to the surface of the aggregate. Since the aggregate is hydrophilic it becomes coated with a water film which tends to loosen and strip the asphalt from the aggregate.

The following objects will be attained by the aspects of this invention.

It is an object of this invention to provide a bituminous material-mineral aggregate composition which is resistant to moisture.

It is another object to provide a paving composition which is resistant to decomposition by moisture.

It is another object to provide a method for preserving bitumen-mineral aggregate paving composition.

It is another object to provide a bitumen composition having an increased affinity for mineral aggregate.

It is still another object to provide a method for preventing the stripping of asphalt from rock aggregate by the action of moisture.

Other objects will be apparent to one skilled in the art upon reading this disclosure.

We have found that the adhesion of asphalt, or road oil to aggregate in the presence of water may be very substantially improved by use of certain additives in an asphalt-aggregate mixture. Our improved composition comprises a road oil or asphalt, aggregate, a heavy, unsaturated oil, obtained as a by product in an HF catalyzed process, and an inorganic metal compound such as aluminum sulfate or lime (calcium hydroxide). The road oil, inorganic metal compound, and unsaturated oil may be mixed together and the aggregate subsequently coated with the resulting composition. Alternatively, the aggregate may be coated with the inorganic metal compounds in the form of a solution or slurry in water or as a dry powder, and subsequently coated with the road oil containing the acid-soluble oil. The additives may also be employed in an emulsified asphalt with equal success. Other polyvalent inorganic metal compounds including lead nitrate, ferrous nitrate, ferric nitrate, barium hydroxide, zinc sulfate, ferrous chloride, ferric chloride, calcium oxide, copper sulfate, etc., can be used, however, lime and aluminum sulfate are preferred.

In hydrocarbon conversion processes in which hydrofluoric acid is employed as a catalyst, for example, alkylation and isomerization reactions, a hydrocarbon phase and an acid phase are formed. The hydrocarbon phase and acid phase are separated and hydrofluoric acid is recovered from the acid phase and is returned to the conversion system. The materials remaining after the removal of the hydrofluoric acid from the acid phase comprise a composition known as "HF acid-soluble oil." It is not known as to exactly what materials make up the acid-soluble oil. The acid-soluble oil is, however, highly unsaturated, high in aromatic content, and upon evaporation of the more volatile fractions leaves a solid resin.

In the case of a typical commercial process for the alkylation of isoparaffins with olefins, the charge to the alkylation reactor comprises an isoparaffin stream, for example, a stream which is predominantly isobutane, and an olefin stream containing, for example, butylenes, with or without other olefins such as propylene and amylenes. Normal paraffins and alkyl cycloparaffins can be similarly alkylated with an olefin. The primary product is an alkylate suitable for use in making aviation gasoline. In the case of aromatic alkylation the charge to the reactor may contain benzene, toluene or other aromatic hydrocarbon, and an olefin the exact nature of which depends upon the product desired. Thus, if long chain alkyl aromatics are being produced for subsequent sulfonation to form synthetic detergents, the olefin stream may comprise $C_{10}$ to $C_{16}$ monoolefins. In either case, however, the charge to the HF alkylation process is substantially free from diolefinic compounds. The formation of acid-soluble oils seems to be a characteristic of all hydrocarbon conversions in which HF is employed as a catalyst, whether the primary reaction be one of alkylation, isomerization or olefin polymerization. Hence the chemical nature of the acid-soluble oil is quite different from that of the diolefin polymer formed in the clay treating and sulfuric acid treating processes, which are well known in the art.

We have discovered that the heavier fraction of such an HF acid-soluble oil, that is, the fraction boiling above 250° F. is a particularly effective anti-strip agent in road oils or asphalts when used with a metal compound in the manner previously described. These oils have an API gravity between 14 and 24, an iodine No. (Wijs) above 150, preferable above 170, a Saybolt Universal viscosity at 210° F. between 40 and 150 secs., a pour point above 10° F., a non-volatile fraction between 50 and 85 percent according to ASTM D154–50, and are highly aromatic in character.

The amount of additive oil to be used depends upon the character of the bitumen and the aggregate, but from 0.1 to 3 weight percent of the weight of bitumen is generally satisfactory. The amount of inorganic metal compound varies from .2 to 5 times the weight of acid-soluble oil employed.

EXAMPLE I

In the following tests a typical HF acid-soluble oil, obtained by the HF alkylation of isobutane with butylenes, was employed which had the following characteristics:

| | |
|---|---|
| Gravity, ° API | 17.1 |
| SUV at 210° F. | 135 |
| Flash, COC ° F. | 265 |
| Iodine No. (Wijs) | 185 |
| Percent non-volatile | 83.3 |
| Acid No. | 0.46 |
| Free acid | 0.004 |
| Percent F | 0.154 |
| Percent S | 0.072 |
| Pour pt. ° F. | 30 |

Preparation of the aggregate

The aggregate used in the tests was a sample which had shown excessive stripping characteristics in the presence of water. The sample was prepared by washing natural fines from the aggregate, crushing and removing coarse material. The screen analysis of the resulting aggregate is given below.

| | Weight percent |
|---|---|
| Passing ¾ inch | 100 |
| Passing 4 mesh | 60.0 |
| Passing 10 mesh | 32.4 |
| Passing 40 mesh | 14.4 |
| Passing 200 mesh | 9.6 |

Strip tests

In these tests the additives were added to the road oil in the percentages noted, based on road oil plus additive, in Table I. In each case the aggregate was oiled by hand at 60° C. with 3.5 percent of the road oil-additive mix. The oiled samples (200 grams each) were allowed to stand in air for 24 hours at room temperature, then were immersed in 400 cc. of tap water in a quart glass jar and soaked 24 hours after which time they were mechanically shaken in a Ro-tap (commercial laboratory screen shaking machine) for a period of 15 minutes. After removal from the Ro-tap, the fines were decanted onto a 200 M screen, and the stripped fines washed through. Ten cc. of 0.05 M $AlCl_3$ were added to the washings to induce flocculation, the water decanted from the settled fines, and the fines dried in an oven at 80° C. The separated and dried fines were then weighed to determine the weight of stripped fines (through 200 mesh).

The road oil used in this test was a straight run SC-3 asphalt.

The condition of the coarse aggregate was visually observed and is reported qualitatively as good, fair, or poor.

TABLE I

| Test No. | 1 | 2 | 3 | 4 | 5 | 6 | 7 | 8 |
|---|---|---|---|---|---|---|---|---|
| Acid-soluble Oil, wt. Percent | 0 | 14.3 | 0 | 1 | 0 | 1 | 0 | 1 |
| Inorganic Metal Compound | | | $Pb(NO_3)_2$ | $Pb(NO_3)_2$ | lime | lime | $Al_2(SO_4)_3$ | $Al_2(SO_4)_3$ |
| Weight Percent | | | 1 | 1 | 1 | 1 | 1 | 1 |
| Percent Strip (Fines) | 40.57 | 54.62 | 45.55 | 38.30 | 38.3 | 13.6 | 8.39 | 2.95 |
| Strip (Coarse) | Poor | Poor | Poor | Fair | Fair | Fair | Fair | Good |

The acid-soluble oil when used as a single additive, does not appear to improve the stripping qualities of the aggregate tested. When the acid-soluble oil is used in conjunction with a metal compound, for example, aluminum sulfate, lead nitrate, or a lime a marked improvement in the stripping qualities of the aggregate is shown.

The synergistic effect of acid-soluble oil upon the composition of asphalt-aggregate paving materials constitutes a valuable forward step in the preparation of lasting and economical road building materials.

The compositions of this invention are also particularly suitable for making construction units or building blocks suitable for moderate sized buildings. These building blocks are usually made in forms or moulds and are 12 inches by 18 inches by 4 inches in size. Emulsified asphalt is usually employed and when the blocks have dried or cured they are mortared together with fresh bitumen-aggregate composition. Smaller aggregate are ordinarily used in building blocks than are used in paving compositions.

Building blocks made with the compositions of this invention are resistant to moisture and can be painted with oil base paints.

Reasonable variations and modifications are possible within the scope of the disclosure to the present invention, the essence of which is that improved paving compositions having resistance to deterioration by moisture are made possible by incorporation of HF acid-soluble oils and a metal compound to bitumen aggregate paving compositions.

We claim:

1. A moisture resistant paving composition comprising bitumen; mineral aggregate; from 0.02 to 15 weight percent of said bitumen of an alkali-earth metal hydroxide; and from 0.1 to 3 weight percent of said bitumen of HF acid-soluble oil obtained as a by-product from an HF catalyzed hydrocarbon conversion process and having a higher boiling point than any of the reactant hydrocarbons.

2. The composition of claim 1 wherein the HF acid-soluble oil is obtained by the HF alkylation of paraffins with olefins.

3. The composition of claim 1 wherein the HF acid-soluble oil has an API gravity between 14 and 24; an iodine number above 150; a viscosity at 210° F. between 40 and 150 seconds; a pour point above 10° F.; and a non-volatile fraction between 50 and 85 percent.

4. A composition comprising bitumen; mineral aggregate; from 0.02 to 15 weight percent of said bitumen of calcium hydroxide; and from 0.1 to 3 weight percent of said bitumen of HF acid-soluble oil obtained as a by-product from an HF catalyzed hydrocarbon conversion process and having a higher boiling point than any of the reactant hydrocarbons.

5. A composition comprising bitumen; mineral aggregate; from 0.02 to 15 weight percent of said bitumen of barium hydroxide; and from 0.1 to 3 weight percent of said bitumen of HF acid-soluble oil obtained as a by-product from an HF catalyzed hydrocarbon conversion process and having a higher boiling point than any of the reactant hydrocarbons.

6. A building block molded from a composition comprising emulsified asphalt; mineral aggregate; from 0.1 to 3 weight percent of said asphalt of HF acid-soluble oil obtained as a by-product in the HF catalyzed conversion of hydrocarbons and having a boiling point above 250° F.; and from 0.02 to 15 weight percent of said asphalt of an alkali-earth metal hydroxide.

7. A composition comprising bitumen; an alkali-earth metal hydroxide; and an HF acid-soluble oil obtained as a by-product from an HF catalyzed hydrocarbon conversion process and having a higher boiling point than any of the reactant hydrocarbons, said hydroxide and said acid-soluble oil being present in amounts sufficient to increase the affinity of the bitumen for mineral aggregate.

8. A composition comprising bitumen; up to 15 weight percent of said bitumen of an alkali-earth metal hydroxide; and up to 3 weight percent of said bitumen of an HF acid-soluble oil obtained as a by-product from an HF catalyzed hydrocarbon conversion process and having a higher boiling point than any other reactant hydrocarbon, said hydroxide and said acid-soluble oil being present in an amount sufficient to increase the affinity of the bitumen for mineral aggregate.

References Cited in the file of this patent

UNITED STATES PATENTS

| | | |
|---|---|---|
| 1,992,240 | Sodtler | Feb. 26, 1935 |
| 2,059,051 | Sparks | Oct. 27, 1936 |
| 2,348,565 | Ott | May 9, 1944 |
| 2,705,681 | Wishlinski et al. | Apr. 5, 1955 |
| 2,775,530 | Gagle et al. | Dec. 25, 1956 |